United States Patent
Eldar

(10) Patent No.: US 10,074,151 B2
(45) Date of Patent: Sep. 11, 2018

(54) DENSE OPTICAL FLOW ACCELERATION

(71) Applicant: Intel Corporation, Santa Clara, CA (US)

(72) Inventor: Avigdor Eldar, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 155 days.

(21) Appl. No.: 14/871,857

(22) Filed: Sep. 30, 2015

(65) Prior Publication Data

US 2017/0091894 A1 Mar. 30, 2017

(51) Int. Cl.
*G06T 1/20* (2006.01)
*G06T 1/00* (2006.01)

(52) U.S. Cl.
CPC .............. *G06T 1/20* (2013.01); *G06T 1/0007* (2013.01); *G06T 2207/10016* (2013.01); *G06T 2207/20021* (2013.01)

(58) Field of Classification Search
None
See application file for complete search history.

(56) References Cited

U.S. PATENT DOCUMENTS

| | | | | |
|---|---|---|---|---|
| 9,304,940 B2 * | 4/2016 | Dixon | ..................... | G06F 12/14 |
| 9,658,663 B2 * | 5/2017 | Huang | ..................... | G06F 1/206 |
| 2007/0169057 A1 * | 7/2007 | Silvera | .................. | G06F 8/4452 |
| | | | | 717/160 |
| 2009/0268085 A1 * | 10/2009 | Myaskouvskey | ....... | G06F 17/12 |
| | | | | 348/441 |
| 2013/0024662 A1 * | 1/2013 | Renganarayana | .... | G06F 9/3004 |
| | | | | 712/208 |
| 2013/0212352 A1 * | 8/2013 | Anderson | ............. | G06F 9/3869 |
| | | | | 712/1 |
| 2013/0259317 A1 * | 10/2013 | Gaddy | ..................... | G06T 7/207 |
| | | | | 382/107 |
| 2013/0265460 A1 | 10/2013 | Wu et al. | | |
| 2013/0283277 A1 * | 10/2013 | Cai | .......................... | G06F 1/329 |
| | | | | 718/102 |
| 2014/0019984 A1 * | 1/2014 | Li | .......................... | G06F 9/5027 |
| | | | | 718/102 |
| 2014/0029807 A1 | 1/2014 | Qi et al. | | |
| 2015/0067008 A1 * | 3/2015 | Kamath | .................. | G06F 17/18 |
| | | | | 708/202 |

(Continued)

OTHER PUBLICATIONS

Chase, Jeff, et al. "Real-time optical flow calculations on FPGA and GPU architectures: a comparison study." Field-Programmable Custom Computing Machines, 2008. FCCM'08. 16th International Symposium on. IEEE, 2008.*

(Continued)

*Primary Examiner* — Yu Chen

(74) *Attorney, Agent, or Firm* — Schiff Hardin LLP

(57) ABSTRACT

Described herein are technologies related to technologies to facilitate real-time computer vision applications, especially those with autonomous or semi-autonomous locomotive robots (e.g., drones or self-driving cars). More particularly, the technologies described herein facilitate, for example, real-time motion estimation using dense optical flow. The technologies accelerate dense optical flow (DOF) processing of images by using the parallel processing techniques of a single-instruction, multiple data (SIMD) computing system.

18 Claims, 17 Drawing Sheets

(56) References Cited

U.S. PATENT DOCUMENTS

| | | | |
|---|---|---|---|
| 2016/0161981 A1* | 6/2016 | Sakurai | G06F 9/52 |
| | | | 713/400 |
| 2017/0083065 A1* | 3/2017 | Huang | G06F 1/3296 |
| 2017/0148371 A1* | 5/2017 | Qian | G09G 3/2044 |

OTHER PUBLICATIONS

Brox, et al. "High Accuracy Optical Flow Estimation Based on a Theory for Warping", In Proc. 8th European Conference on Computer Vision, vol. 4, May 2004, 12 pages.
Brox, et al. "Variational Optical Flow Estimation", tutorial, Part III, 2009, 10 pages.
Gwosdek, Pascal "Realtime Optical Flow Algorithms on the Cell Processor", Master's Thesis, Section 6.5, Apr. 14, 2008, 161 pages.
Wikipedia, "Horn-Schunck Method", From Wikipedia, the free encyclopedia, retrieved on Dec. 7, 2015, 3 pages.
Wikipedia, "Lucas-Kanade Method", From Wikipedia, the free encyclopedia, retrieved on Dec. 7, 2015, 3 pages.
Wikipedia, "Multigrid Method", From Wikipedia, the free encyclopedia, retrieved on Dec. 7, 2015, 4 pages.
Wikipedia, "Optical Flow", From Wikipedia, the free encyclopedia, retrieved on Dec. 7, 2015, 5 pages.
Wikipedia, "Successive Over-Relaxation", From Wikipedia, the free encyclopedia, retrieved on Dec. 7, 2015, 4 pages.
International Search Report and Written Opinion received for PCT Application No. PCT/US2016/049527, dated Jan. 12, 2017, 15 pages.

* cited by examiner

DENSE OPTICAL FLOW ACCELERATION

BACKGROUND

Optical flow (i.e., optic flow) is a concept from the realm of image/video processing and machine vision. Optical flow is often utilized to aid in motion estimation and digital video compression. Optical flow is often used in estimating a three-dimensional (3D) nature and structure of a scene, as well as the 3D motion of objects and the observer relative to the scene. While this is something that that the human vision system does easily, optical flow is the mechanism by which a machine can estimate relative motion of a scene. As used herein, a scene is a digital video (or series of images) that is the subject of an optical flow analysis.

For example, optical flow is used by robotics researchers in many areas such as: object detection and tracking, image dominant plane extraction, movement detection, robot navigation, image processing, motion detection, object segmentation, time-to-contact information, focus of expansion calculations, luminance, motion compensated encoding, and stereo disparity measurement, visual odometry. Optical flow information has been recognized as being useful for controlling micro air vehicles (e.g., drones) and self-driving transportation vehicles (e.g., cars).

Generally, optical flow is the pattern of apparent motion of objects, surfaces, and edges in a visual scene caused by the relative motion between an observer (i.e., an eye or a camera) and a scene.

Optical flow is typically accomplished at a pixel level of subsequently captured images. So, pixel-level optical flow estimation calculates the motion between two subsequent images. Analysis of subsequent images searching for local displacements of pixels in the images allows quantitative measurement of the optical flow of the pixels.

Stated another way, optical flow can generally refer to a change in x-axis position and a change in y-axis position for each point within a pair of two dimensional images. An optical flow vector can describe such change in x and change in y in vector form and an optical flow field can aggregate the optical flow vectors for each point in the images. Such optical flow fields can be computed over a series of sequential images.

DETAILED DESCRIPTION

Figure 1:
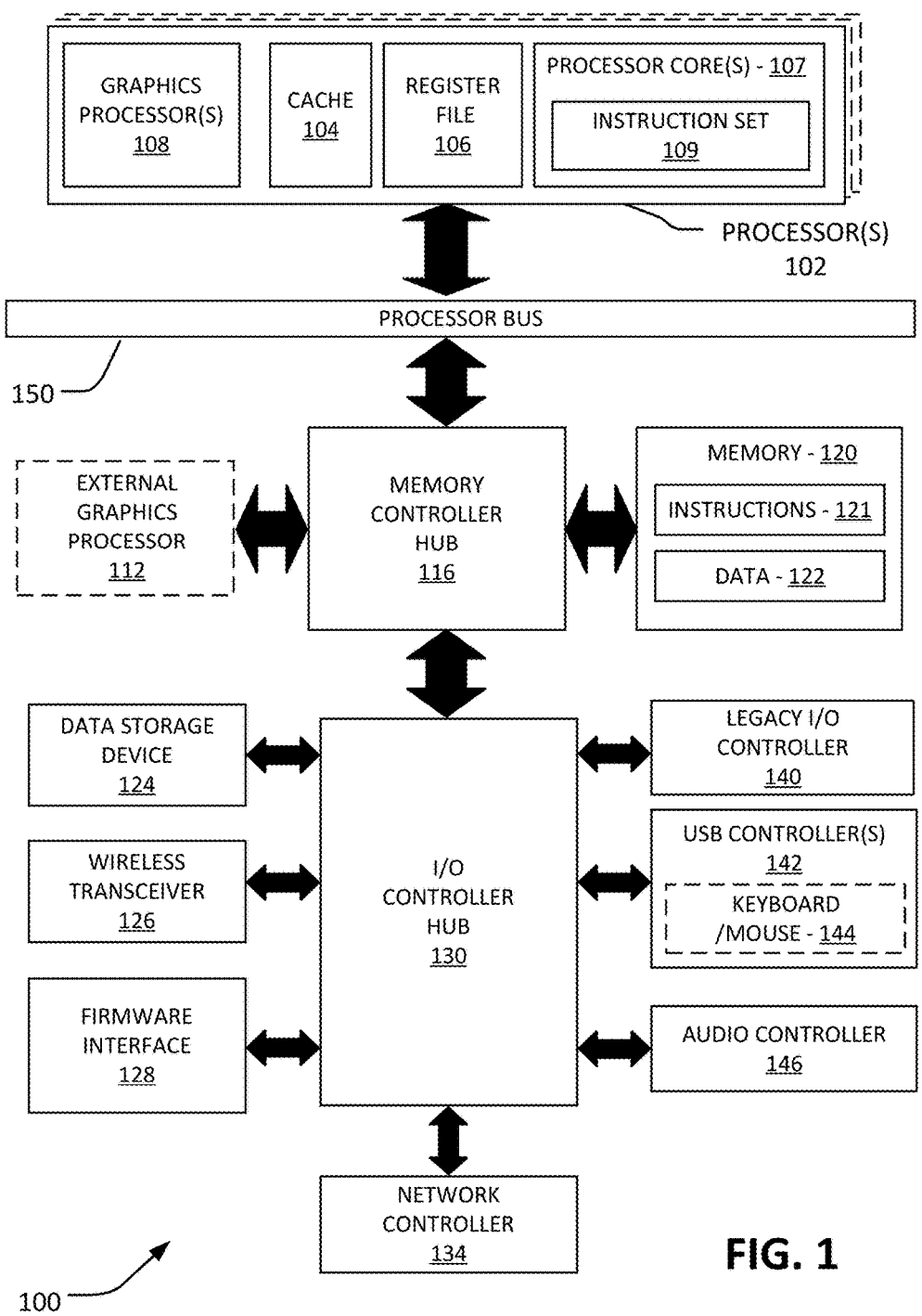
FIG. 1 is a block diagram of a data processing system according to an embodiment.

Described herein are technologies to facilitate real-time computer vision applications, especially those with autonomous or semi-autonomous locomotive robots (e.g., drones or self-driving cars). More particularly, the technologies described herein facilitate, for example, real-time motion estimation using dense optical flow. The technologies accelerate dense optical flow (DOF) processing of images by using the parallel processing techniques of a single-instruction, multiple data (SIMD) computing system. With the techniques described herein, the SIMD computing system performs DOF-based SIMD operations on each window of pixels of an image without interdependency inside that window. That is, the DOF process does not dependent on pixel data from other pixels within the window of pixels that is the subject of the DOF-based SIMD operation. In addition, the techniques also introduce minimal threading parallelization approach to solve DOF calculations efficiently.

There are two types of optical flow: Sparse and dense. The sparse optical flow (SOF) techniques only need to process some pixels from a whole image. However, the dense optical flow (DOF) techniques process all the pixels of an image.

Since they are processing less data, SOF techniques are typically faster DOF techniques. Because of that, SOF is often used in time critical situations. For example, locomotive autonomic or semi-autonomic machines (i.e., drone or self-driving car) observe and analysis the world about them and then take appropriate actions. Since the machine is moving (e.g., flying, driving, rolling, etc.), it needs process the incoming visual data quickly enough to act in a timely manner. For example, a self-driving car must correctly identify an object ahead in the road in sufficient time to take evasive maneuvers. That is, the machine must act in real-time.

Typically, the incoming visual data is received at fifteen (15) to thirty (30) frames per second. Of course, in some instances it may be more or less frames per second. With a typical high-definition (HD) video, each frame (e.g., image) may have one to four million pixels. In some instances, a HD camera may capture six, eight, ten, twelve, or more million pixels per frame.

Consider, for example, a 1080i video system of a machine that receives twenty-five frames per second. Such a system would deliver nearly fifty-two million (52,000,000) pixels for analysis per second. The sheer volume of data is quickly overwhelming for many machines. This is especially so when one considers that something like a self-driving car will need to analyze this massive amount of data fast enough and effectively enough for a moving car to take evasive maneuvers in a timely manner.

Because of this real-time pressure of efficient handling of such big data, engineers often choose sparse optical flow (SOF) over dense optical flow (DOF) techniques. The sparse optical flow (SOF) techniques only need to process some pixels from a whole image. However, the dense optical flow (DOF) techniques process all the pixels of an image. Since they are processing less data, sparse optical flow techniques are typically faster and, thus, are often used in the real-time data analysis situations.

Unfortunately, since the conventional SOF techniques are accurate for a very limited set of pixels. To accelerate the DOF techniques, some have considered a parallel processing approach. Typically, parallel processing involves the simultaneous use of more than one central processing unit (CPU) or processor core to execute a program or multiple computational threads. Ideally, parallel processing makes programs run faster because there are more engines (i.e., CPUs or cores) running it.

In particular, the use of a single instruction multiple data (SIMD) approach can accelerate the DOF technique. With SIMD, all parallel engines share the same instruction, but each carries it out on different data elements. A SIMD operation of a SIMD computing system acts on a collection of pixel data. That is, the SIMD operation acts on the data of multiple pixels.

Typically, that collection is a 1 by X "window" of X number of adjacent (i.e., side-by-side) pixels of a regular two-dimensional array (i.e., grid) of pixels. That is, the side-by-side pixels of the SIMD window are part of the same row or the same column of pixels. Herein, such a window in a row is called a row window and such a window in a column is called a column window. Herein, the term "row/column" window or rectangular window refers to either type. Of course, other window sizes and shapes are possible for other implementations. Regardless, a SIMD window contains or defines multiple pixels.

Unfortunately, conventional parallel processing approaches like SIMD have not been effective or feasible with DOF because most DOF approaches utilize an iterative process that depends upon calculations using data from pixels found in a SIMD window of linearly successively adjacent pixels. Such dependencies are called local. A SIMD operation cannot act on all of the pixels of a row/column window because of these local dependencies.

By definition, a SIMD operation acts on all of the pixels in its window simultaneously. However, the SIMD operation cannot do that if the operation being performed on a pixel depends upon the result of a calculation of one of the pixels in the window. That is, the SIMD operation cannot perform effectively with local dependencies (i.e., dependencies within the SIMD window). Thus, for a SIMD operation to perform properly and its expected parallel-processing manner, the instruction on each pixel must be independent of the instructions being performed on the other pixels of the SIMD window. That is, it must not have local dependencies (i.e., locally independent).

Conventional DOF approaches and the conventional row/column windows of SIMD operations on an array of pixels have local dependencies. The conventional approaches/operations depend upon the results of the instructions/calculations of the other pixels in the row/column window.

As has already been alluded to, a conventional approach to create a dense optical flow (DOF) map involves iteration. More particularly, it involves calculating a set of differential equations (i.e., variational method) and iteratively solving them using linear system solvers. Successive Over Relaxation (SOR) is a conventional method to solve DOF. In numerical linear algebra, the SOR method is a variant of the Gauss-Seidel method for solving a linear system of equations, resulting in faster convergence. A similar method can be used for any slowly converging iterative process.

System Overview

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
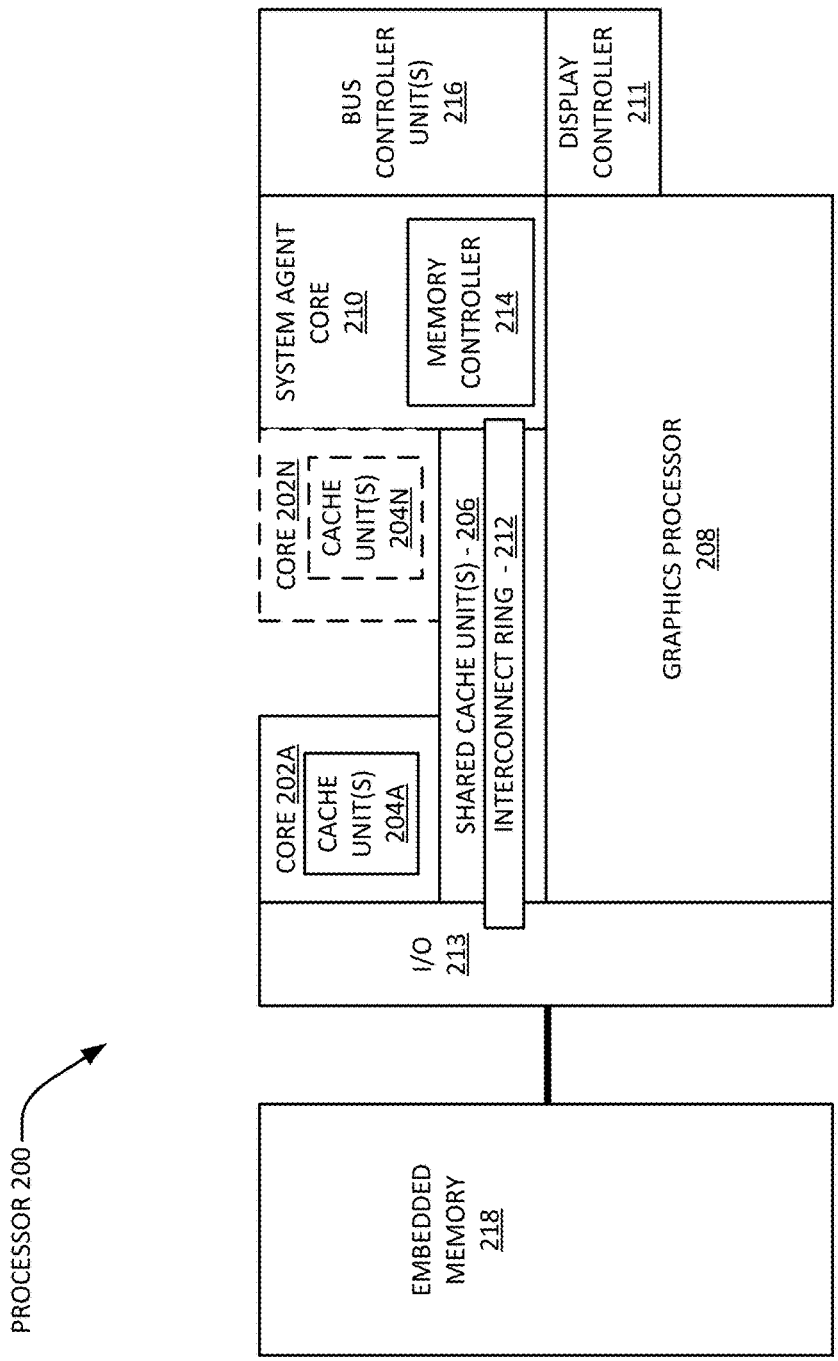
FIG. 2 is a block diagram of an embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
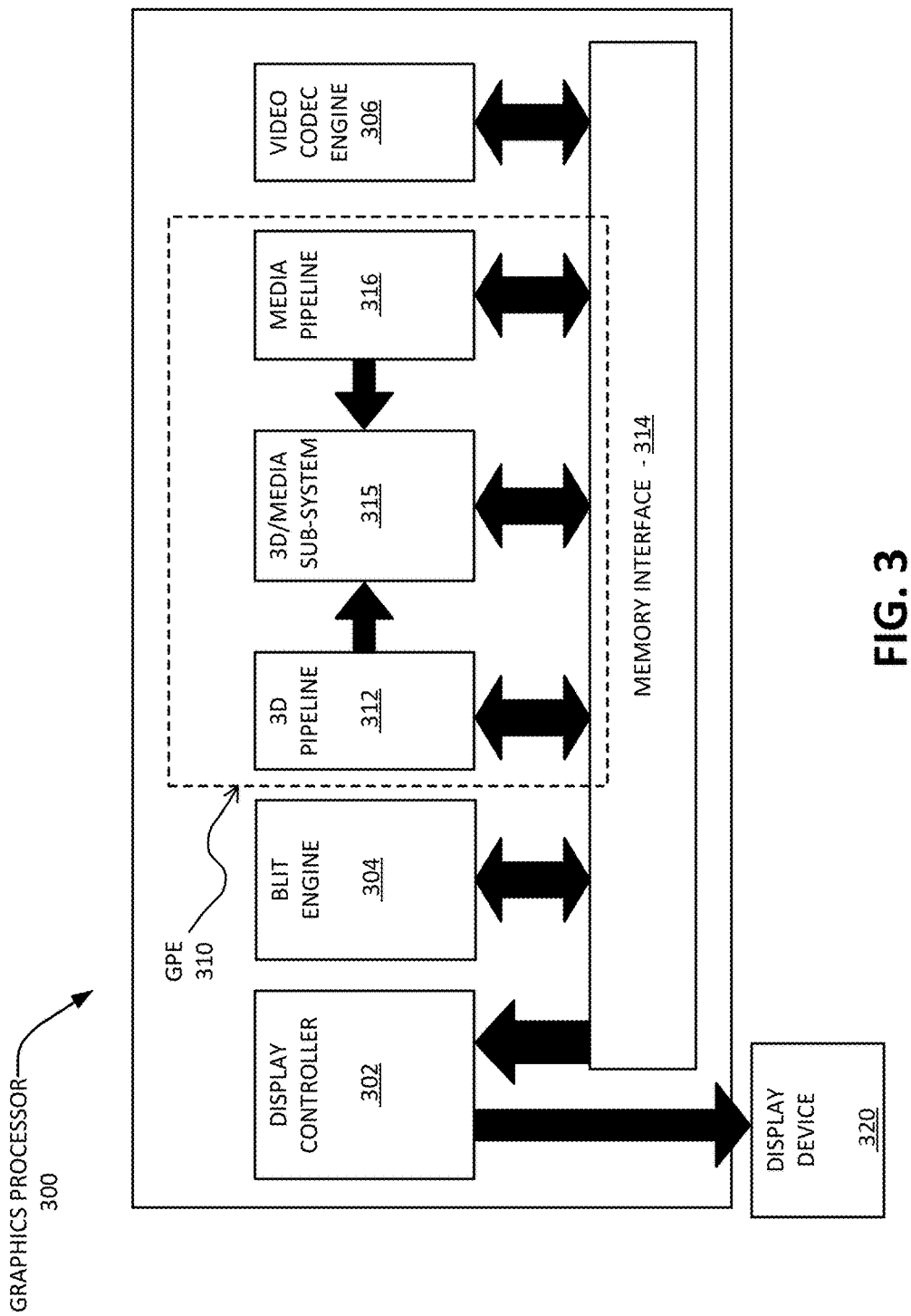
FIG. 3 is a block diagram of one embodiment of a graphics processor which may be a discrete graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
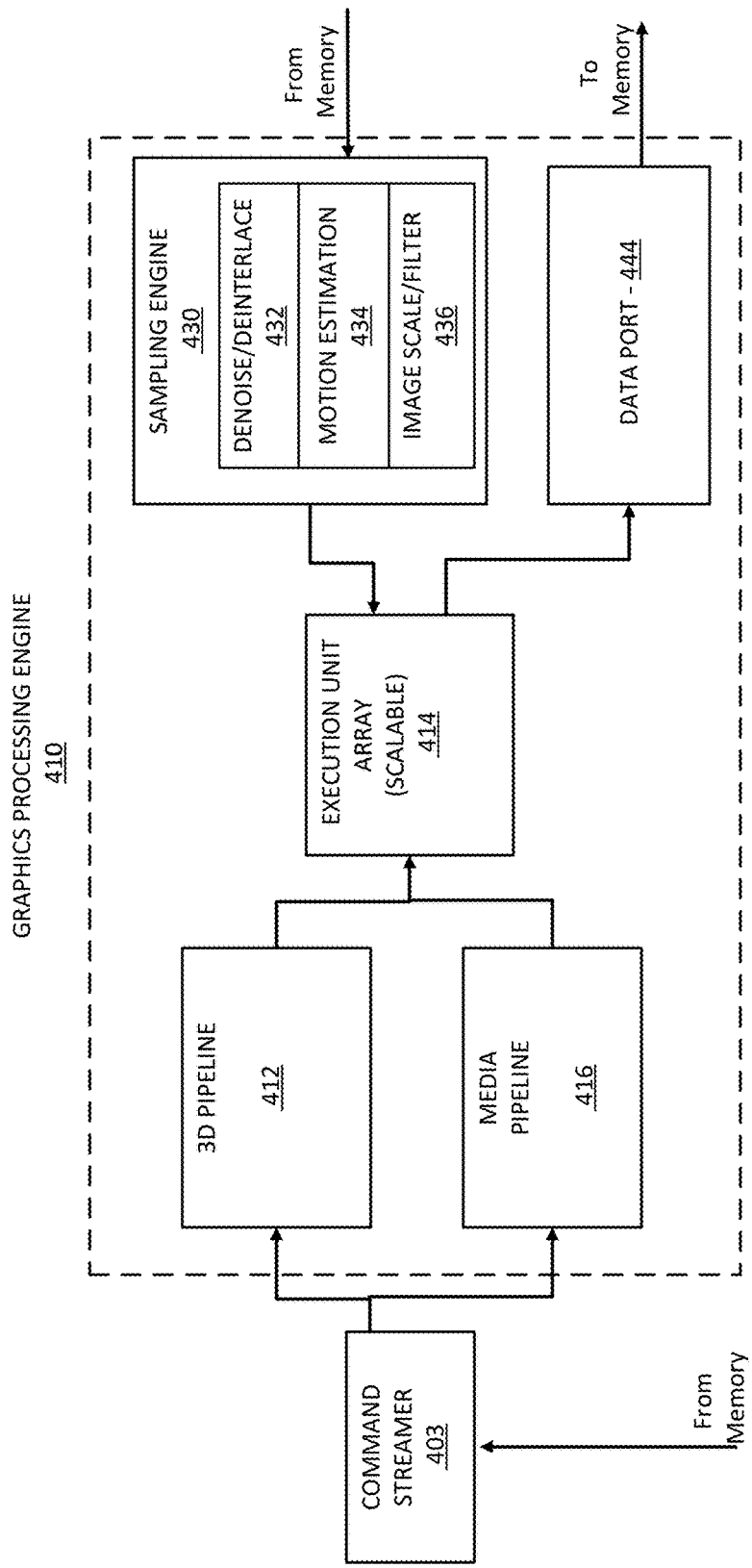
FIG. 4 is a block diagram of an embodiment of a graphics processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
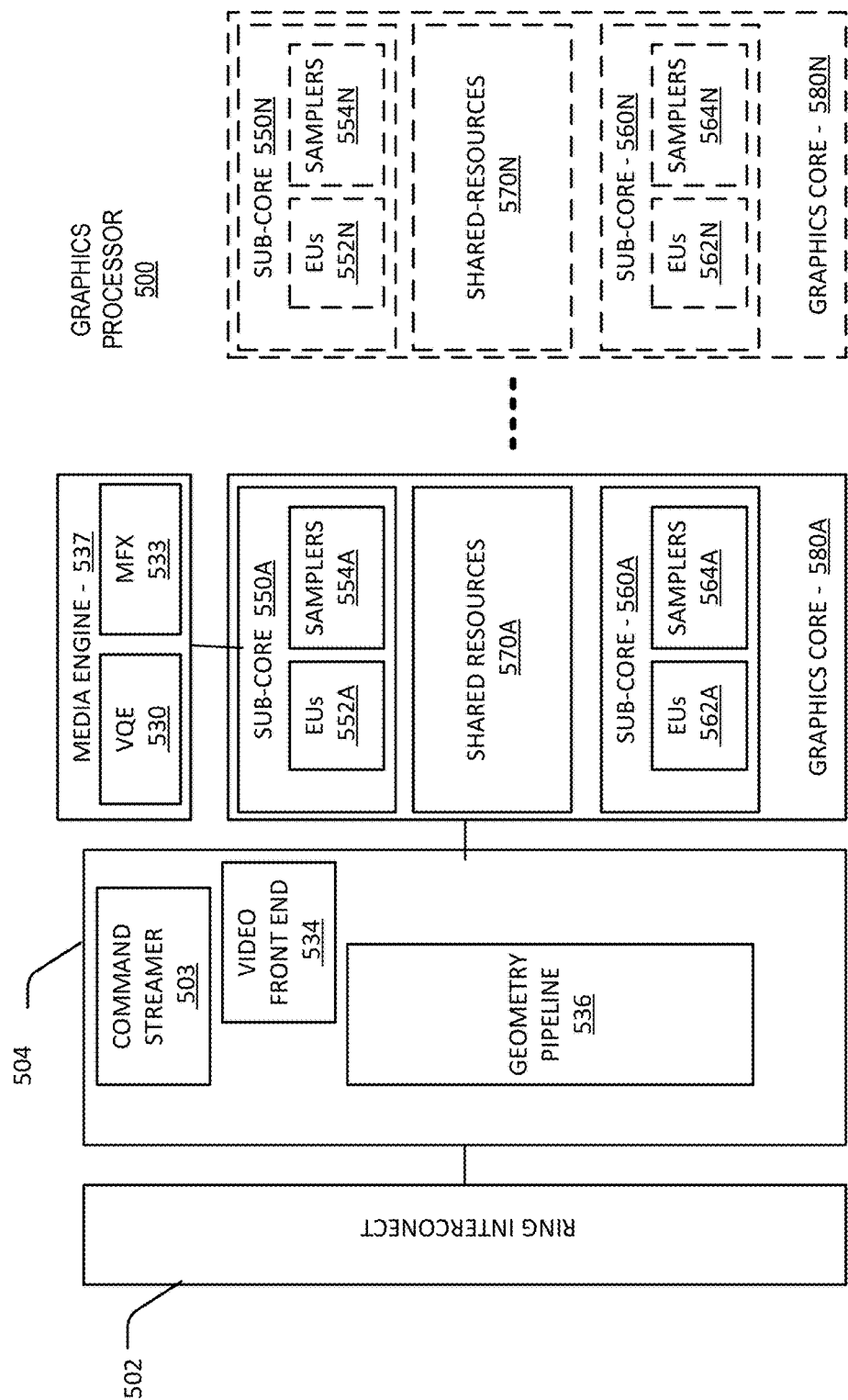
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
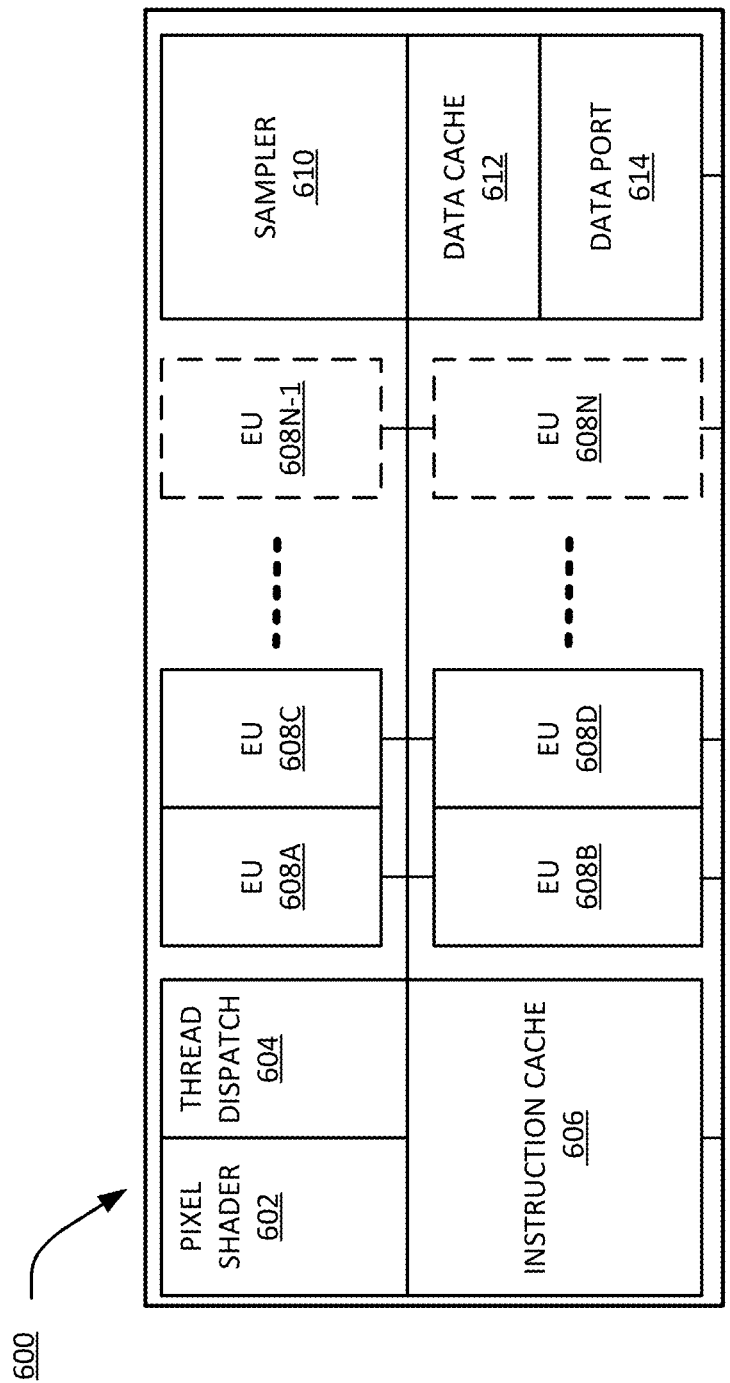
FIG. 6 illustrates thread execution logic including an array of processing elements employed in one embodiment of a graphics processing engine.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
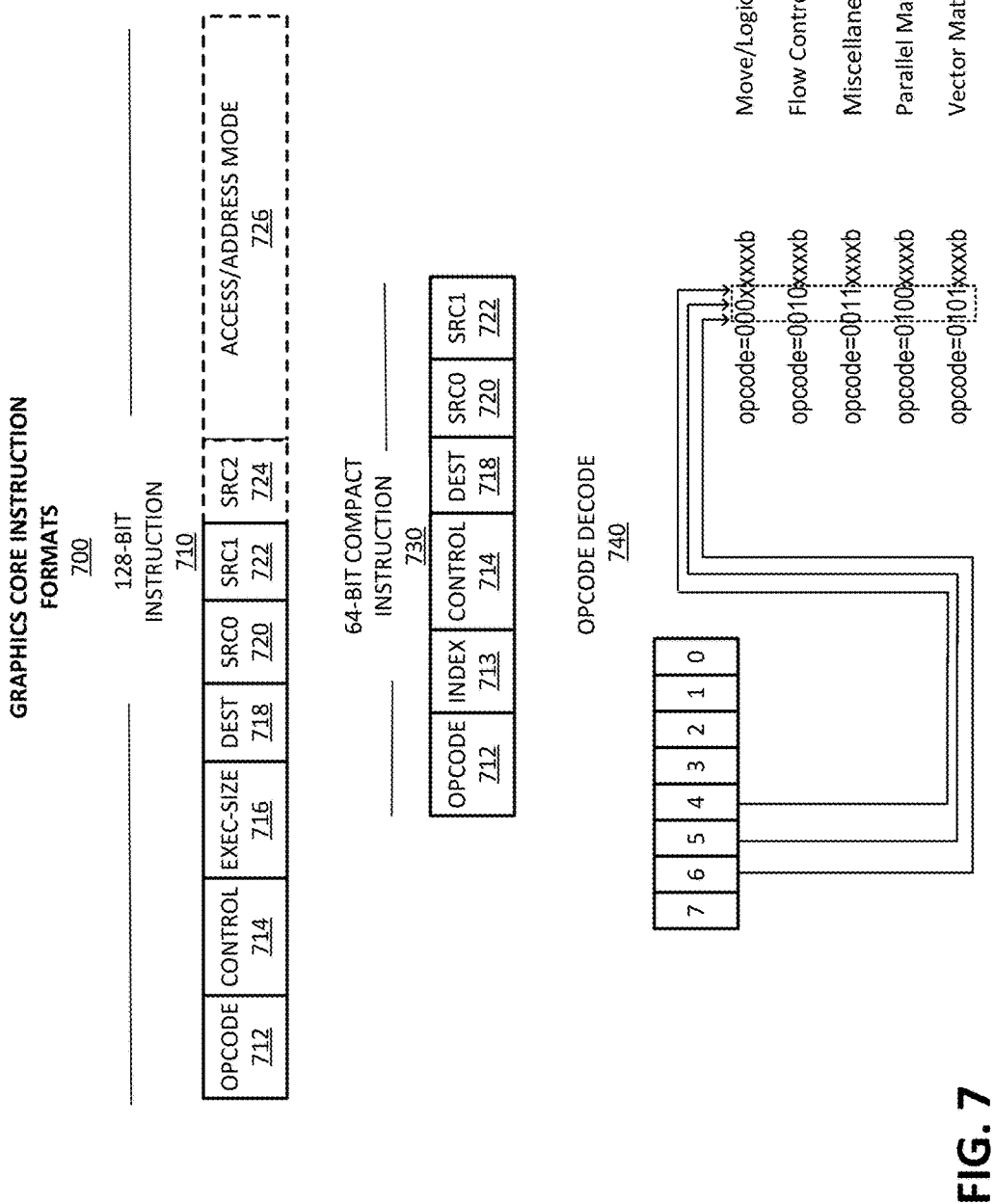
FIG. 7 is a block diagram illustrating a graphics processor execution unit instruction format according to an embodiment.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
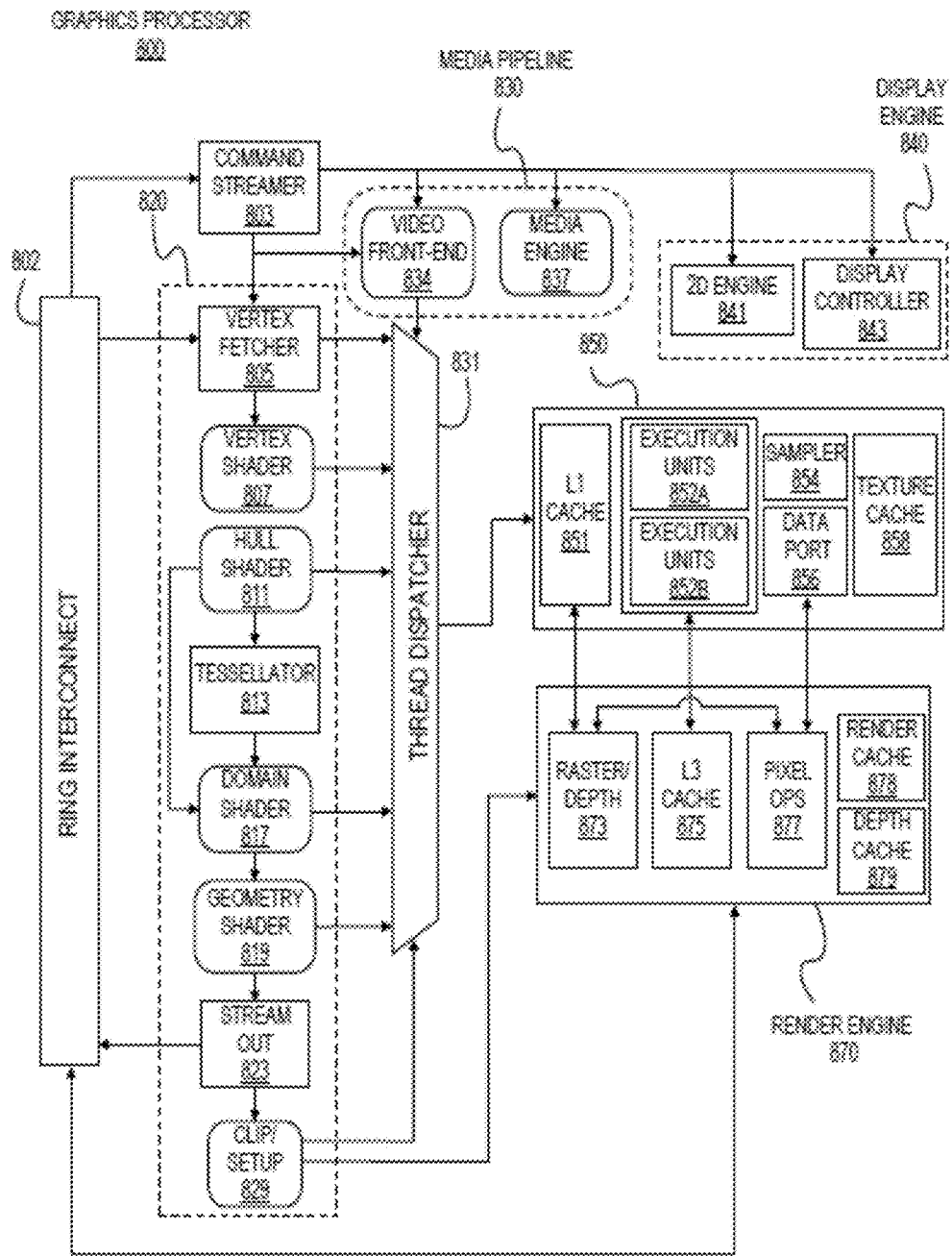
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer/depth 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access unrasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9A:
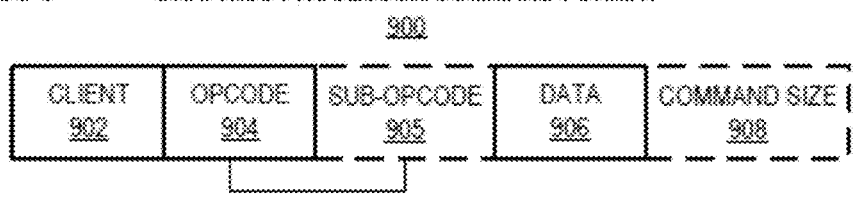
FIG. 9A is a block diagram illustrating a graphics processor command format according to an embodiment and FIG. 9B is a block diagram illustrating a graphics processor command sequence according to an embodiment.
Figure 9B:
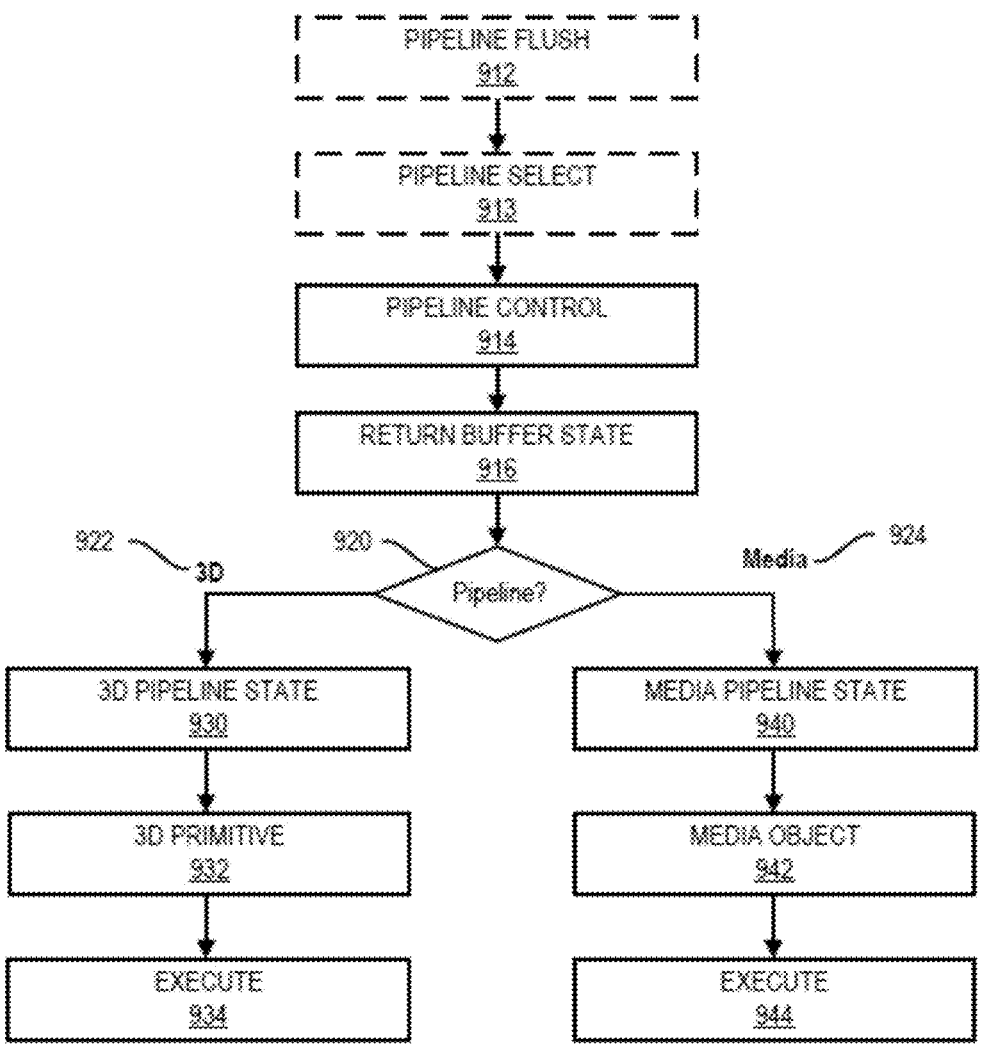

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
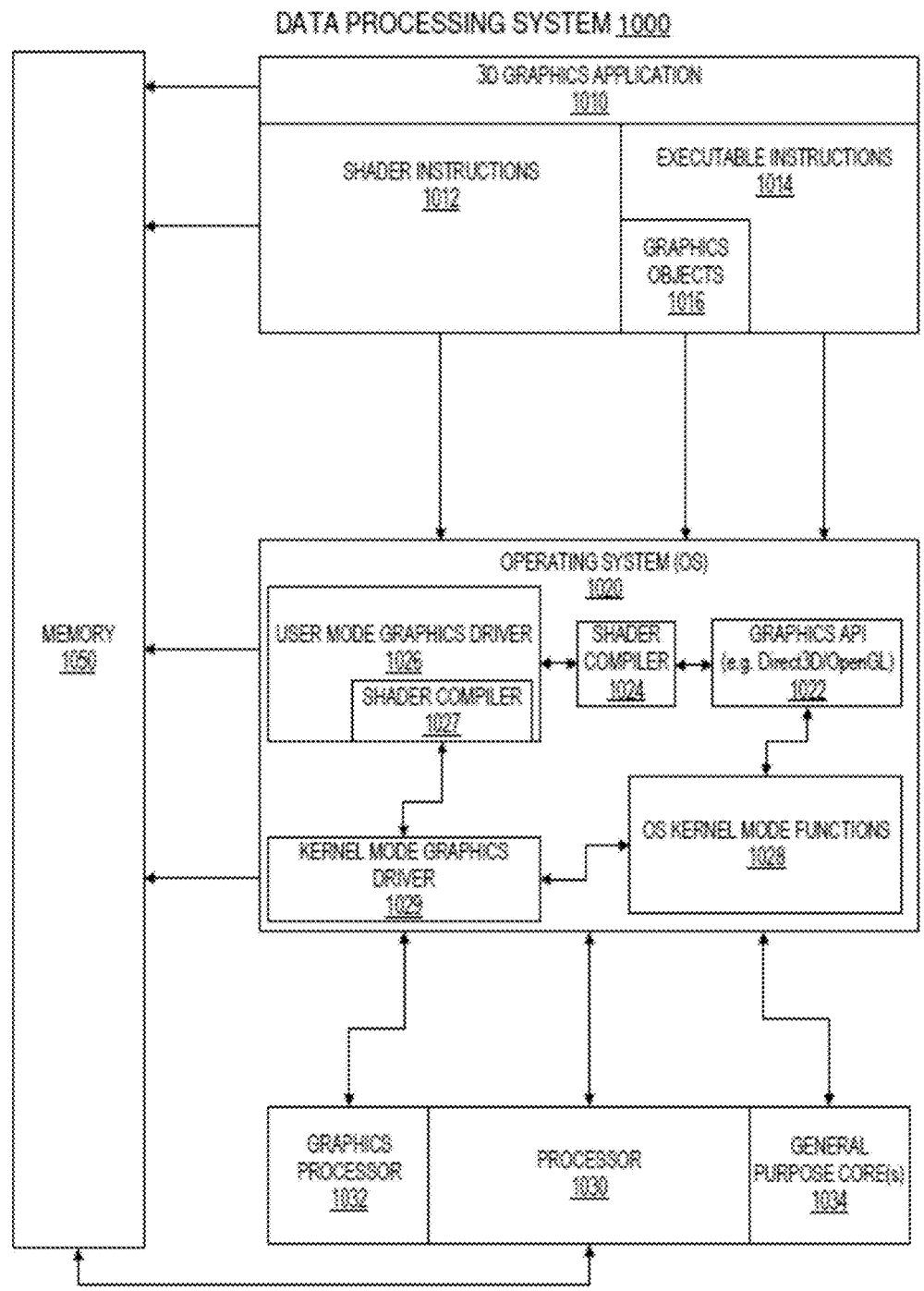
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
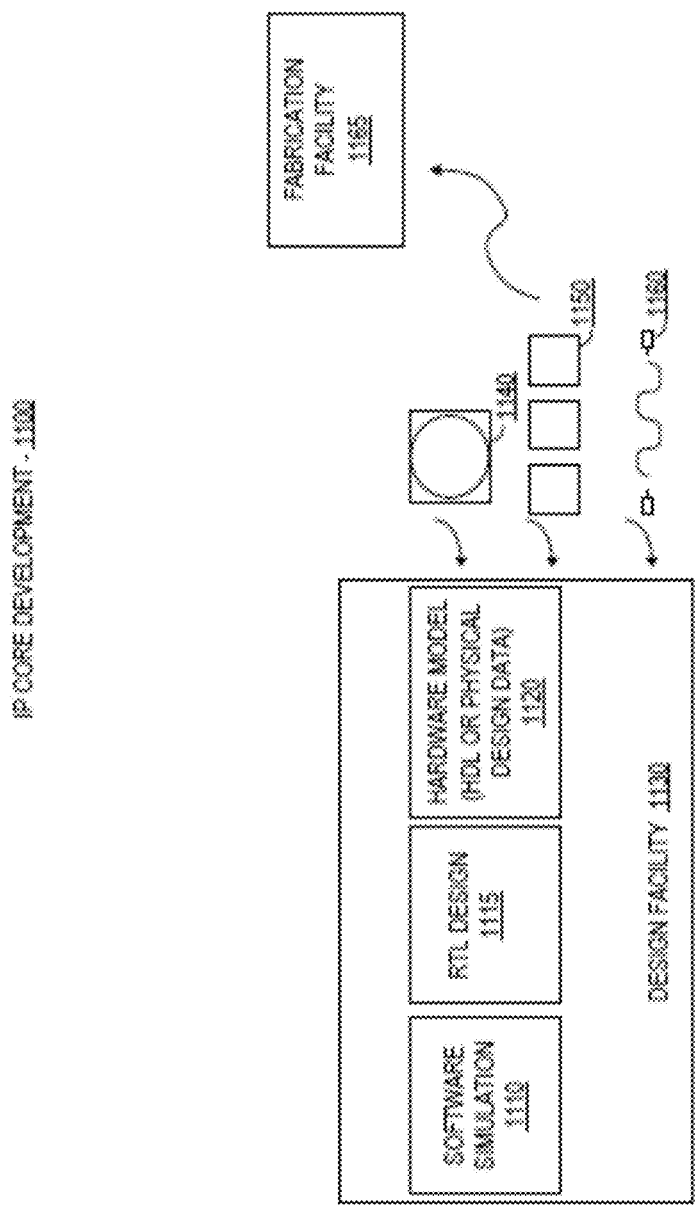
FIG. 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model 1100. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3$^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 12:
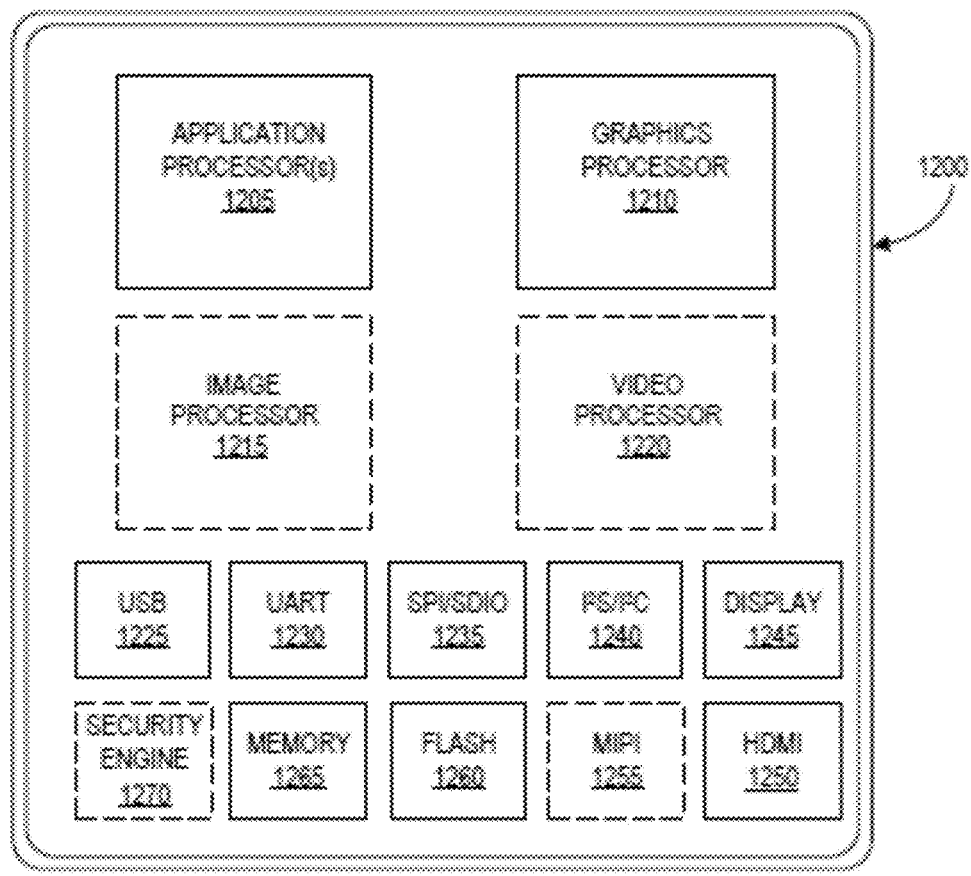
FIG. 12 is a block diagram illustrating an exemplary system on a chip integrated circuit that may be fabricated using one or more IP cores, according to an embodiment.

FIG. 12 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an I²S/I²C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general purpose processor cores.

Successive Over-Relaxation (SOR)

The successive over-relaxation (SOR) method is a way of solving a linear system of equations Ax=b derived by extrapolating the Gauss-Seidel method. In that equation, where A is the regular positive semidefinite and symmetric coefficient matrix sized n×n, and x, b are the variable and constant right hand size vectors, respectively, with n elements, each.

SOR is derived from the Gauss-Seidel method. The element of the vector $x^k$ is used for the computation of the next element. Indeed, applying the iteration rule $$x_i^k = \frac{b_i}{a_{i,i}} - \sum_{j=1}^{i-1} \frac{a_{i,j}}{a_{i,i}} x_j^k - \sum_{j=i+1}^{n} \frac{a_{i,j}}{a_{i,i}} x_j^{k-1}. \qquad \text{Equation 1}$$

quickly converges against the solution. It is called the Gauss-Seidel method.

The Gauss-Seidel method can be written to explicitly express the changes each iteration step applies:

$$x_i^k = x_i^{k-1} + \left( \frac{b_i}{a_{i,i}} - \sum_{j=1}^{i-1} \frac{a_{i,j}}{a_{i,i}} x_j^k - \sum_{j=i}^{n} \frac{a_{i,j}}{a_{i,i}} x_j^{k-1} \right) \qquad \text{Equation 2}$$

With relaxation parameters 0<ω<2, the step width is not only damped while perpetuating convergence, but it can even be amplified. In this way can be proved to converge.

$$x_i^{(k+1)} = (1 - \omega)x_i^{(k)} + \frac{\omega}{a_{ii}} \left( b_i - \sum_{j<i} a_{ij} x_j^{(k+1)} - \sum_{j>i} a_{ij} x_j^{(k)} \right), \qquad \text{Equation 3}$$

$$i = 1, 2, \ldots, n.$$

For ω>1, this method is called the Successive Over-Relaxation (SOR). Especially when choosing ω close to 2, this process converges significantly faster than a pure Gauss-Seidel setting. In 1947, it was shown that if A is symmetric and positive-definite then ρ(L_ω)<1 for 0<ω<2. Thus convergence of the iteration process follows, but we are generally interested in faster convergence rather than just convergence For the techniques described herein, the SOR is expressed is expressed in this manner:

$$u_{i,j}^{k+1} = (1 - \omega)u_{i,j}^k + \omega \qquad \text{Equation 4}$$

-continued $$[J_{13}]_{i,j} + [J_{12}]_{i,j} v_{i,j}^k -$$

$$\frac{\alpha\left(\sum_{l\in\{x,y\}}\sum_{(\bar{i},\bar{j})\in N_l^-(i,j)} \frac{u_{\bar{i},\bar{j}}^{k+1}}{h_l^2} + \sum_{l\in\{x,y\}}\sum_{(\bar{i},\bar{j})\in N_l^+(i,j)} \frac{u_{\bar{i},\bar{j}}^k}{h_l^2}\right)}{\left(-[J_{11}]_{i,j} - a \sum_{l\in\{x,y\}}\sum_{(\bar{i},\bar{j})\in N_l(i,j)} \frac{1}{h_l^2}\right)}$$

$N_l$ denotes the two-neighborhood of the point i, j alongside l, and $N^+_l$, $N^-_l$ represent the right and bottom, as well as the top and left neighbors (e.g., pixels), respectively.

Herein, SOR assumes the use of a discretized rectangular grid (e.g., of pixels) with a regular spacing of $h_x$ and $h_y$. The labels u and v are used to refer to columns and rows, respectively. Of course, in other descriptions, the roles of u and v can be reversed.

Example Scenario

Figure 13:
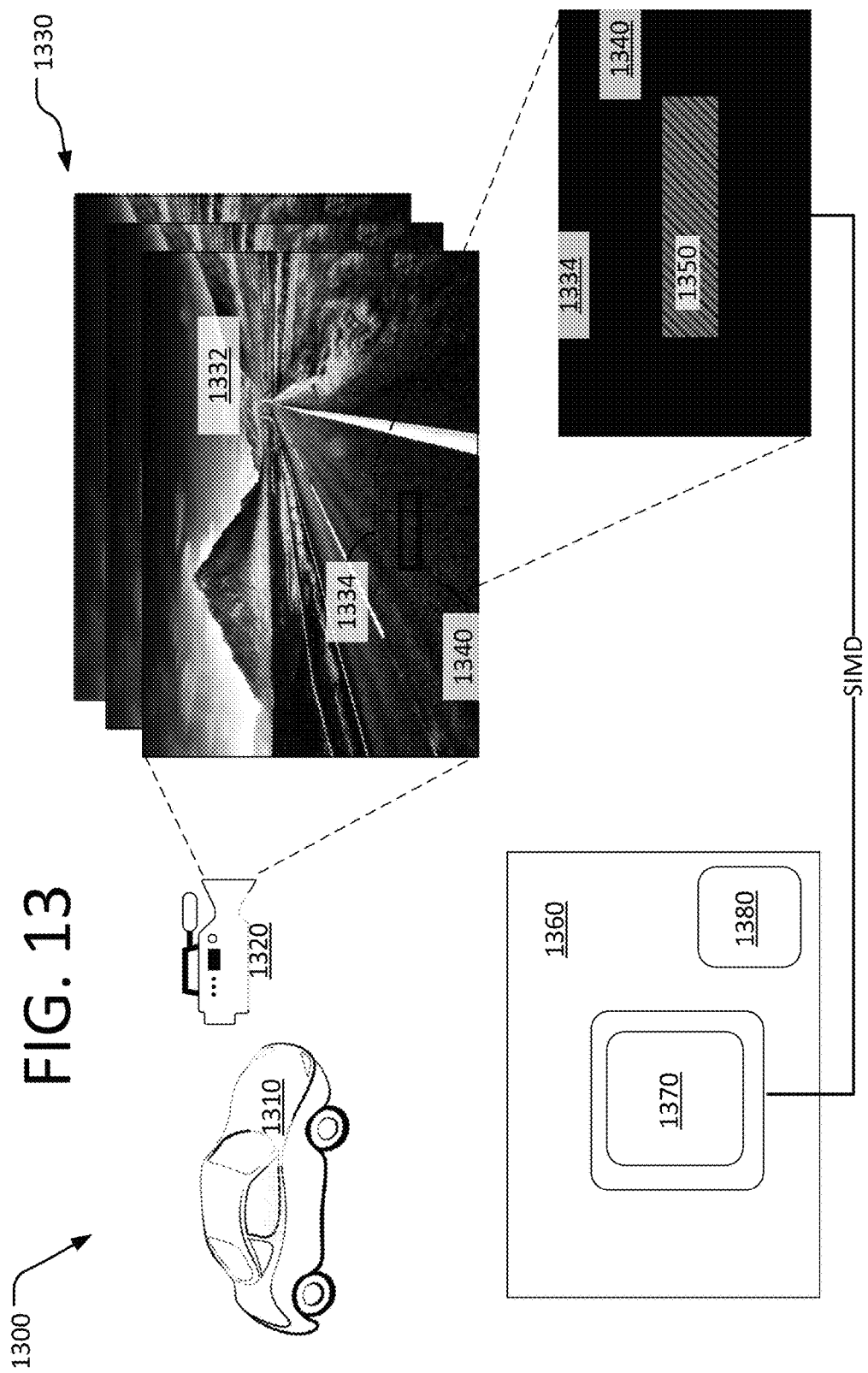
FIG. 13 illustrates an example scenario in accordance with implementations described herein.

FIG. 13 shows an example scenario 1300 in which real-time analysis of computer vision using DOF process would be helpful. The scenario 1300 shows an autonomous or semi-autonomous vehicle 1310 (e.g., automobile) with one or more cameras 1320. These cameras 1320 capture digital video 1330 in real-time. Image 1332 is an example of a frame captured as part of the real-time video 1330.

Region 1334 of image 1332 represents an area of interest that will be a focus of this discussion. Region 1334 is shown, in FIG. 13, in both the image 1332 and in a slightly enlarged section. As depicted, region 1334 shows a discretized regular grid of pixels 1340. Typically, the size of pixels relative to the overall image is quite small. Indeed, they would be smaller than as is depicted in FIG. 13. The pixel size is exaggerated here for illustration purposes.

A SIMD window 1350 is shown as part of the grid 1340. As shown, the window includes four neighboring row/column pixels. That window 1350 is an example of one of the windows of data that a SIMD computing system 1360 operates on with its SIMD processors/cores 1370. The SIMD computer system may be separate part of the vehicle 1310 itself or separate from and in communication with the vehicle. In other implementations, the computing system 1360 is generally a parallel-processing computer and the processor 1370 generally a parallel-processing processor.

One or more implementations of the technology described herein may be employed by the computing system 1360 as shown in the example scenario 1300. In particular, the implementations may facilities real-time analysis and decision-making based upon the successive images of the video 1330. Based upon such analysis, the vehicle 1310 may make evasive maneuvers in a timely manner to avoid an obstruction in the roadway.

This example scenario 100 may also be described as a single-instruction multiple-data (SIMD) computing system (such as 1360) that facilitates acceleration of dense optical flow (DOF) determinations. That system includes an image handler of a SIMD computing system configured to obtain an image that is stored in a memory 1380, wherein the image is formatted as a canonical discretized rectangular grid of pixels. The image handler may be the processor 1370 configured with the appropriate software, firmware, or dedicated hardware. The SIMD processor of the SIMD computing system coupled to the memory and the SIMD processor is configured to produce DOF data of the image by: defining multiple SIMD windows of pixels of the image, wherein each window includes multiple pixels of the image and only a portion of the image; and performing a successive over-relaxation (SOR) operation simultaneously on each the pixels of each of the SIMD windows, wherein the SOR operation performed on each pixel of each window is performed without local dependencies within its own window. There is a reporter of the SIMD computing system configured to present the produced DOF data of the image. The reporter may be the processor 1370 configured with the appropriate software, firmware, or dedicated hardware.

SOR with SIMD Window

Figure 14:
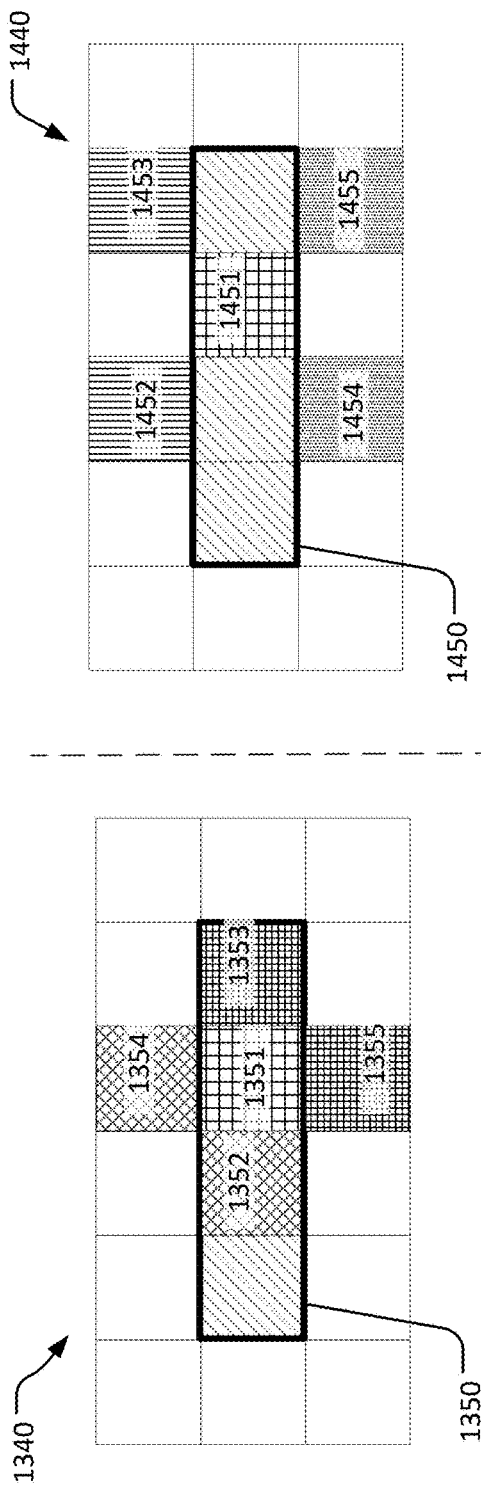
FIG. 14A illustrates an example of SIMD (single instruction multiple data) window used with a conventional SOR (successive over-relaxation) technique.
FIG. 14B illustrates an example of SIMD window used with a new SOR technique in accordance with implementations described herein.

FIG. 14A is a graphic illustration of how a conventional SIMD computer system would attempt to use a conventional SOR approach (like that of Equation 4). FIG. 14A shows the grid 1340 (like that of FIG. 13) but without the region 1334 or image 1332. Also depicted is the SIMD window 1350 of four adjacent pixels in a row of the grid.

For this discussion, it is presumed that pixel 1351 of the window 1350 is presently being processed in accordance with a conventional SOR approach. In so do, the following equation is used to determine which pixels upon which iterations are based:

$$N_l(i,j) = \vdots N_l^-(i,j) \cup N_l^+(i,j) \qquad \text{Equation 5}$$

$N_l(i,j)$ is a neighborhood definition. That is, the definition of the neighboring pixels upon which the SOR calculations for pixel at (i,j) (which is pixel 1351 here) are dependent upon for its iterative process. This can be broken-down in this fashion.

$$\vdots N_l^-(i,j) = \{(i-1,j),(i,j-1)\}$$

$$N_l^+(i,j) = \{(i+1,j),(i,j+1)\} \qquad \text{Equation 6}$$

$N_l$ denotes the two-neighborhood of the point i, j alongside l, and $N^+_l$, $N^-_l$ represent the right and bottom, as well as the top and left neighbors (e.g., pixels), respectively.

As noted by the similarly patterned box 1410 in FIG. 14A, the $N_l^-$ calculations are dependent upon previous calculations for pixels 1352 and 1354. In addition, as noted by the similarly patterned box 1412 in FIG. 14A, the $N_l^+$ calculations are dependent upon previous calculations for pixels 1353 and 1355

Note that pixels 1352 and 1353 are inside the SIMD window 1350. This means that the SIMD operation performed on that window 1350 will have local dependencies (e.g., inside that window) based upon necessary calculations for pixels 1352 and 1353 before the SOR calculations can be completed for pixel 1351. Consequently, this defeats the purpose and benefit of SIMD operations because all of the SOR calculations must be performed sequentially just like a non-SIMD computer system.

FIG. 14B is a graphic illustration of how a SIMD computer system performs an updated SOR approach (like that of Equation 4). FIG. 14B shows a grid 1440 (similar to grid 1340 of FIG. 13). Also depicted is a SIMD window 1450 of four adjacent pixels in a row of the grid.

For this discussion, it is presumed that pixel 1451 of the window 1450 is presently being processed in accordance with the new techniques described herein. As noted by the similarly patterned box 1460 in FIG. 14B, the $N_l^-$ calculations are dependent upon calculations for pixels 1452 and 1453. In addition, as noted by the similarly patterned box 1462 in FIG. 14B, the $N_l^+$ calculations are dependent upon calculations for pixels 1454 and 1455.

Note that all of the dependent pixels (e.g., 1452-1455) of the neighborhood are outside the SIMD window 1450. This means that the SIMD operation performed on that window

1450 has no local dependencies (e.g., inside that window) based upon calculations for the dependent pixels before the SOR calculations can be completed for pixel 1451. Consequently, the techniques can take full advantage of the parallel processing power of the SIMD computing system because the operations can be performed on each pixel in the window 1450 simultaneously. That is, no operation on a particular pixel in the window relies upon calculations for another pixel in the window.

Said another way, the techniques described herein include modifying the derivative operators (of the SOR approach) to remove the internal (e.g., local) SIMD dependencies.

Rotational Transformation

Figure 15:
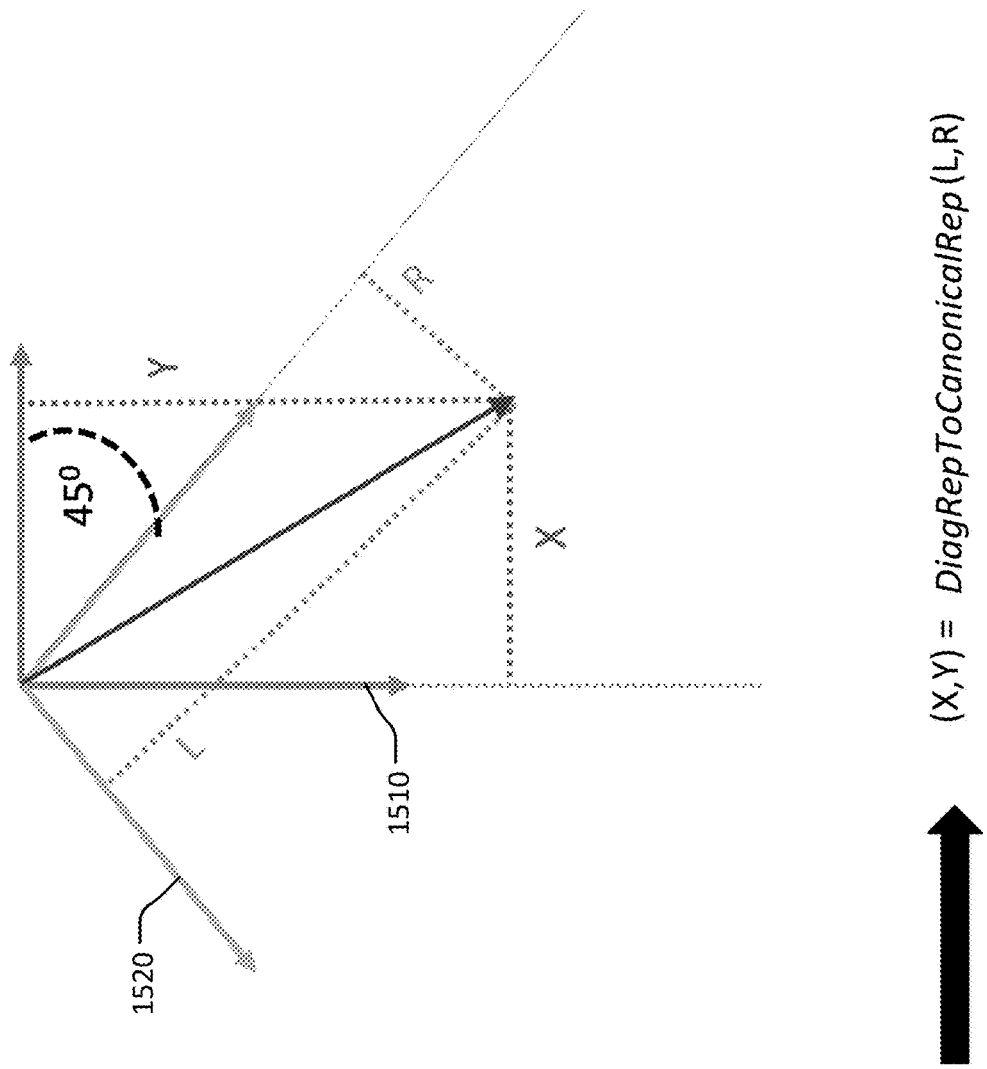
FIG. 15 illustrates an example graph and transformation equations for rotational conversation in accordance with implementations described herein.

FIG. 15 shows an illustration of the how the results of the new SOR-SIMD techniques (as described herein) are transformed into a format that matches the standardized canonical representation of image/video formats and display hardware.

After the new SOR-SIMD techniques (as described herein) are performed on the subject image and/or images, a rotation or shifting transformation is performed on the SOR-SIMD technique results. In a sense, the techniques described herein involve shifting or rotating the typical left/right (or up/down) adjacent neighbor relationships of each pixel in a regular grid of a canonical representation (x,y) to a cater-cornered adjacent neighbor relationships of each pixel in a regular grid of a diagonal representation (L,R). Doing this allows for the final results to match the standardized canonical representation of image/video formats and display hardware.

FIG. 15 shows a graph 1500 with a portion two overlapped regularly grids: XY grid 1510 and LR grid 1520. XY grid 1510 represents the typical left/right (or up/down) adjacent neighbor relationships of each pixel in a regular grid of a canonical representation (x,y). This is the standardized canonical representation of image/video formats and display hardware. It is the familiar rows and columns arrangements where the rows are horizontal and the columns are vertical. LR grid 1520 represents a cater-cornered adjacent neighbor relationships of each pixel in a regular grid of a diagonal representation (L,R). This arrangement is not standard and is typically not used by image/video format or equipment. However, this arrangement is the outcome of the new SOR-SIMD techniques (as described herein).

Thus, a rotation transformation is performed on the results of the new SOR-SIMD techniques (as described herein) to shift from the diagonal representation (L,R) to the canonical representation (X,Y). The equation provided below is one example of a rotation transformation that accomplishes that task:

$$X = \frac{\sqrt{2}}{2}(R - L)$$
$$Y = \frac{\sqrt{2}}{2}(R + L)$$

Equation 7

This equation converts the diagonal representation (L,R) to the canonical representation (X,Y). The transformation itself may be performed on portions (e.g., cells) of the overall image rather than the entire image at the same time.

If each pixel is presumed to be square, then the rotation performed is a 45 degrees (as shown in FIG. 15). However, if the pixels are something other than square, then the exact angle of rotation will vary according to the particular geometry of the pixels in the regular grid.

Example Methodological Implementations

Figure 16:
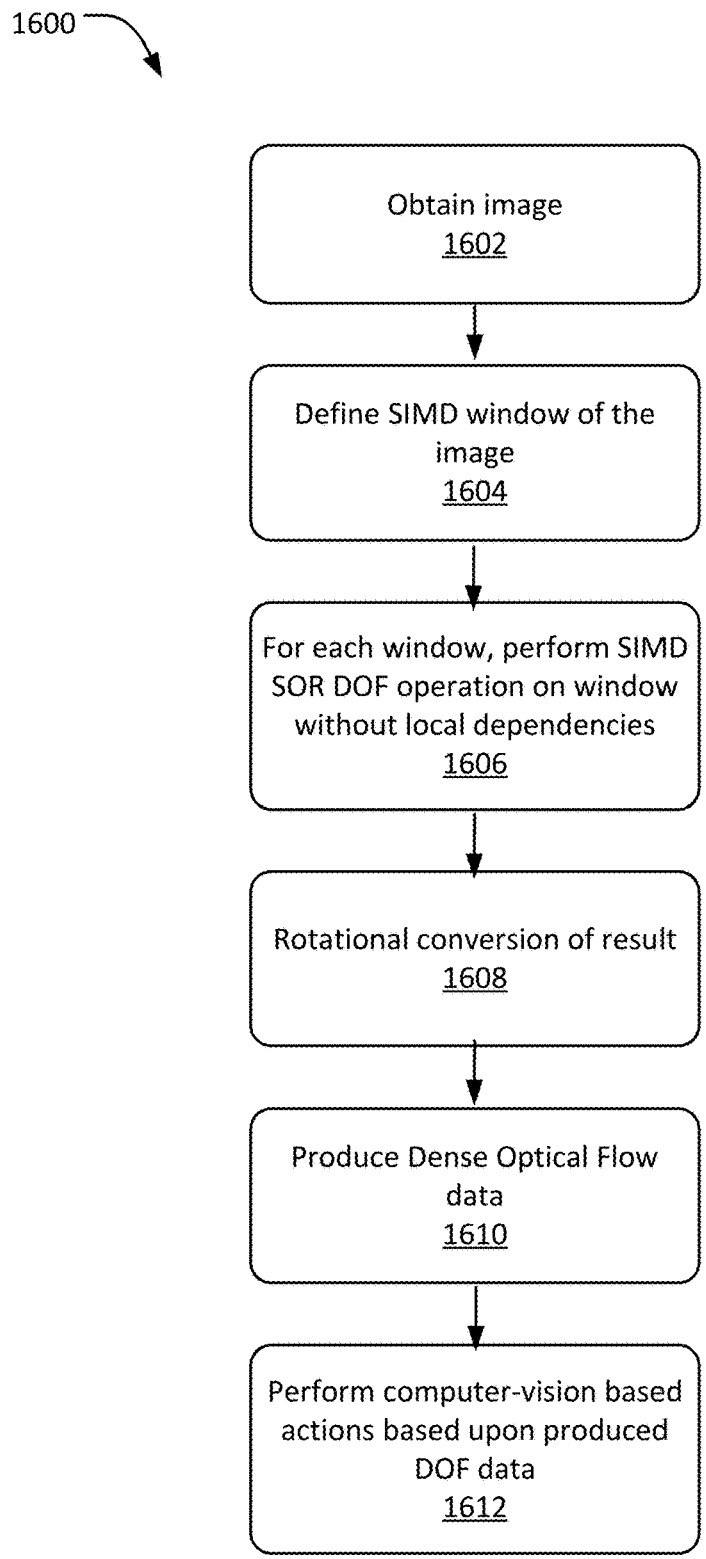
FIG. 16 illustrates an example flowchart illustrating an example dense optical flow acceleration in accordance with implementations as described herein.

FIG. 16 shows an example process 1600 illustrating the techniques as described herein. The example process 1600 may be implemented on, for example, a SIMD computing system. That is, a computing system with a SIMD-based processor.

At block 1602, an example SIMD computing system obtains an image. Such image may be a frame from a real-time (i.e., live) video feed. The obtained image is typically formatted (i.e., defined) as a canonical discretized rectangular grid of pixels. The pixels are uniformly sized (and/or distanced from each other) rectangles or squares and are conceptually and actually stacked/aligned horizontal rows and vertical columns. The individual pixels are addressed by two integers that refer to row and column of the grid. Herein, this type of grid of pixels is called a canonical discretized rectangular grid of pixels or simply "canonical grid." Alternatively, this type of grid may be called a horizontal/vertical discretized rectangular grid of pixels or simply "H/V grid."

At blocks 1604 and 1606, the example SIMD computing system produces DOF data of the image (or a portion thereof).

At block 1604, the example SIMD computing system defines one or more of the multiple SIMD windows of pixels of the image. Each window includes multiple pixels of the image and only a portion of the image. This action may include defining a size/shape of the window (e.g., how many pixels wide/high). The example SIMD window of FIG. 14B is four pixels wide. This may also include determining which/where the windows fall on the image.

At block 1606, for each window, the example SIMD computing system performs SIMD SOR DOF operation on the window without local (i.e., internal) dependencies. That is, the SOR DOF operation (like that discussed in relation to FIG. 14B) is simultaneously performed on each pixel in the SIMD window and that is done without depending upon calculations of pixels inside the SIMD window. Instead, the operation depends upon calculations on external pixels (i.e., pixels outside the window). In particular, the calculations are based upon pixels that are cater-cornered neighbors of a subject pixel.

Said another way, block 1606 involves performing a successive over-relaxation (SOR) operation simultaneously on each the pixels of each of the SIMD windows, wherein the SOR operation performed on each pixel of each window is performed without local dependencies within its own window.

At block 1608, the SIMD computing system performs rotational conversion on results of the operations performed in block 1606. This effectively rotates the grid from a diagonal one to a typical conical one with left-right/up-down pixels.

At block 1610, the SIMD computing system produces or presents the dense optical flow (DOF) data, which is the result of block 1608. This data may be passed to another system, such as vehicle 1310. This may involve sending or reporting the DOF data to another application or computing system.

At block 1612, a computing system performs computer-vision based actions based upon produced DOF data. For example, a vehicle may determine a motion of a detected object in the real-time video and direct the vehicle to take evasive action.

Figure 17:
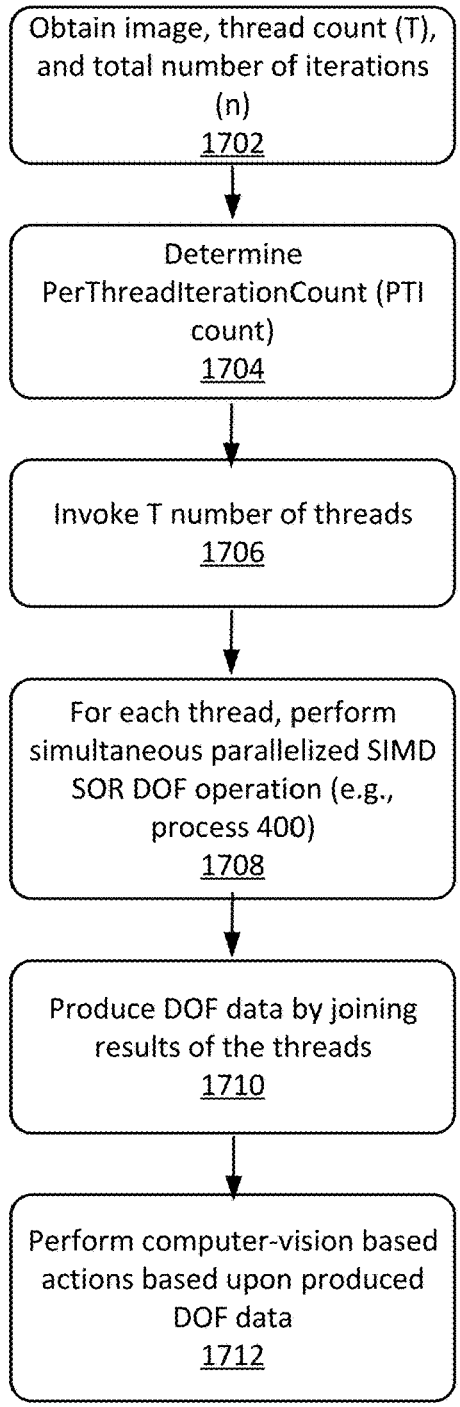
FIG. 17 illustrates an example flowchart illustrating an example dense optical flow acceleration in accordance with implementations as described herein.

FIG. 17 shows an example process 1700 illustrating the techniques as described herein. The example process 1700 may be implemented on, for example, a parallel-processing computing system. For example, it may be a computing system with a SIMD-based processor.

With this process 1700, the SOR computations (or other similar DOF calculations) are parallelized by having each simultaneously running thread run over the entire image and update the iterative data on the fly. This allows independent operation of the threads. Instead of having single thread run for N iterations, T threads can run in parallel, with each performing iterations resulting in a similar solution result.

In general, a thread of execution is the smallest sequence of programmed instructions that can be managed independently by a scheduler, which is typically a part of the operating system. Typically, multiple threads can exist within the same process, executing concurrently (with one starting before others finish) and share resources such as memory, while different processes do not share these resources. In particular, the threads of a process share its instructions and its context. In a parallel-processing computing system, multiple threads can be executed in parallel (i.e., at the same instant), with every processor or core executing a separate thread simultaneously.

At block 1702, a parallel-processing computing system obtains image, thread count (T), and total number of iterations (n). Thread count (T) is the specified number of threads to be run. That may be provided by a user/programmer or calculated. It may be based upon the resources available to the processor. The total number of iterations (n) is number of iterations that the SOR DOF calculations should be iteratively performed to produce a satisfactory result. This may be provided by a user/programmer or calculated.

At block 1704, the parallel-processing computing system determines PerThreadIteration (PTI) count (i.e., number of iterations per thread (IPT)), which is the number of iterations to be performed by each thread. This may be determined by dividing the total number of iterations by the thread count. The PTI count will be the number of iterations performed by each thread.

At block 1706, the SIMD computing system simultaneously executes multiple threads of the SIMD processor. Indeed, thread count (T) is the number of thread invoked. Block 1706 may be repeated to match the IPT number. The threads are dispatched with delay between one dispatch to the next.

A delayed dispatch provides some advantages. For example, with any known or new acceleration method of SOR, it is desirable in a multi-thread scenario to preserve the attribute that an update to a given pixel X at iteration K, only takes place after all pixels in N^-neighborhood of X have been updated at iteration K. This attribute has little significance to a single thread running over the data sequentially. However, it is helpful in a multi-thread implementation as with this and related technologies.

A dispatched delay preserves this attribute. An example multi-thread scenario illustrates this point. Consider thread #2, when it process pixel X for the first time, this pixel and its N^-neighbors, have already been processed by thread #1, so effectively thread #2 applies iteration #2 on this pixels. This is true for thread #n. A different way to view this is as a pipeline approach.

In contrast, if threads are dispatched without delay, the above attribute will not guarantee to hold. Consider the extreme case where all threads are processing the same exact pixel at any given time. Unlike the delayed scenario—when thread #2 is processing pixel X for the first time—it will re-evaluate iteration #1 performed by thread #1. Effectively in this case there will be no acceleration over the single thread approach.

At block 1708, the parallel-processing computing system, for each thread, performs simultaneous parallelized SOR DOF operations. Like that of process 1600. In other implementations, other existing or new forms of SOR DOF operations may be performed at block 1708 of this process.

At block 1710, the parallel-processing computing system produces or presents the dense optical flow (DOF) data, which is the result of block 1708. This data may be passed to another system, such as vehicle 1310.

At block 1712, a computing system performs computer-vision based actions based upon produced DOF data. For example, a vehicle may determine a motion of a detected object in the real-time video and direct the vehicle to take evasive action.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface.

A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

The following examples pertain to further embodiments:

Example 1

A single-instruction multiple-data (SIMD) computing system that facilitates acceleration of dense optical flow (DOF) determinations, the system comprising: an image handler of a SIMD computing system configured to obtain an image that is stored in a memory, wherein the image is formatted as a canonical discretized rectangular grid of pixels; a SIMD processor of the SIMD computing system, the SIMD processor being coupled to the memory, the SIMD processor being configured to produce DOF data of the image by: defining multiple SIMD windows of pixels of the image, wherein each window includes multiple pixels of the image and only a portion of the image; and performing a successive over-relaxation (SOR) operation simultaneously on each the pixels of each of the SIMD windows, wherein the SOR operation performed on each pixel of each window is performed without local dependencies within its own window; a reporter of the SIMD computing system configured to present the produced DOF data of the image.

Example 2

A system of Example 1, wherein the multiple SIMD windows collectively includes the pixels of the image.

Example 3

A system of Example 1, wherein the SIMD window is a row window that is one row high and multiple columns wide.

Example 4

A system of Example 1, wherein the SOR operation performed on each pixel of each window is performed with dependencies outside its own window.

Example 5

A system of Example 1, wherein the SOR operation performed on each pixel of each window is performed with dependencies to diagonally adjacent neighbors that are outside its own window.

Example 6

A system of Examples 1 to 5, wherein the production by the SIMD processor includes transforming results of the simultaneous SOR operations to correspond with a canonical discretized rectangular grid of pixels.

Example 7

A system of Example 1 further comprising: a real-time video input subsystem configured to receive real-time video feed by the SIMD computing system, wherein the image is obtained from a real-time video feed provided by the real-time video input subsystem.

Example 8

A parallel-processing computing system that facilitates acceleration of dense optical flow (DOF) determinations, the system comprising: an image handler configured to obtain an image that is stored in a memory; an initializer configured to obtain a thread count (T) and a total number of iterations (n) for convergence of an iterative dense optical flow (DOF) operation performed on the obtained image; the initializer being further configured to determine a number of iterations per thread (IPT) based upon the thread count and total number of iterations; a parallel processor configured to simultaneously execute multiple threads, wherein each thread performs the iterative converging DOF operation on pixels of the obtained image, the parallel processor being further configured to repeat the simultaneous execution of the multiple threads a number of times matching the determined IPT number; the parallel processor being still further configured to produce DOF data of the image based upon results from the simultaneously executed threads.

Example 9

A system of Example 8, wherein the simultaneous execution of the threads includes delayed dispatch of some of the threads.

Example 10

A system of Example 8, wherein the IPT number is based upon the total number of iterations divided by the thread count.

Example 11

A system of Example 8, wherein the image is formatted as a canonical discretized rectangular grid of pixels and the processor of the parallel-processing computing system is a single-instruction multiple-data (SIMD) processor.

Example 12

A system of Example 11, wherein the production comprises: defining multiple SIMD windows of pixels of the image, wherein each window includes multiple pixels of the image and only a portion of the image; and performing a successive over-relaxation (SOR) operation simultaneously on each the pixels of each of the SIMD windows, wherein the SOR operation performed on each pixel of each window is performed without local dependencies within its own window.

Example 13

A system of Example 12, wherein the SOR operation performed on each pixel of each window is performed with dependencies outside its own window.

Example 14

A system of Example 12, wherein the SOR operation performed on each pixel of each window is performed with dependencies to diagonally adjacent neighbors that are outside its own window.

Example 15

A system of Example 12, wherein the production of the DOF data includes transforming results of the simultaneous SOR operations to correspond with a canonical discretized rectangular grid of pixels.

Example 16

One or more computer-readable media storing processor-executable instructions that when executed cause processors to implement a method comprising: obtaining an image by a parallel-processing computing system; obtaining a thread count (T) and a total number of iterations (n) for convergence of an iterative dense optical flow (DOF) operation performed on the obtained image; determining number of iterations per thread (IPT) based upon the thread count and total number of iterations; simultaneously executing multiple threads of a processor of the parallel-processing computing system, wherein each thread performs the iterative converging DOF operation on pixels of the obtained image; repeating the simultaneous execution of the multiple threads a number of times matching the determined IPT number; producing, by the parallel-processing computing system, DOF data of the image based upon results from the simultaneously executed threads; by: presenting the produced DOF data of the image; and taking action based upon the presented DOF data.

Example 17

One or more computer-readable media of Example 16, wherein the simultaneous execution of the threads includes delayed dispatch of some of the threads.

Example 18

One or more computer-readable media of Examples 16 and 17, wherein the IPT number is based upon the total number of iterations divided by the thread count.

Example 19

One or more computer-readable media of Example 16, wherein the image is formatted as a canonical discretized rectangular grid of pixels and the processor of the parallel-processing computing system is a single-instruction multiple-data (SIMD) processor.

Example 20

One or more computer-readable media of Example 19, wherein the producing comprises: defining multiple SIMD windows of pixels of the image, wherein each window includes multiple pixels of the image and only a portion of the image; and performing a successive over-relaxation (SOR) operation simultaneously on each the pixels of each of the SIMD windows, wherein the SOR operation performed on each pixel of each window is performed without local dependencies within its own window.

Example 21

One or more computer-readable media of Example 20, wherein the SOR operation performed on each pixel of each window is performed with dependencies outside its own window.

Example 22

One or more computer-readable media of Example 20, wherein the SOR operation performed on each pixel of each window is performed with dependencies to diagonally adjacent neighbors that are outside its own window.

Example 23

One or more computer-readable media of Examples 16-22, wherein the taking action includes estimating motion of objects in the image.

Example 24

One or more computer-readable media of Example 20, wherein the producing of the DOF data includes transforming results of the simultaneous SOR operations to correspond with a canonical discretized rectangular grid of pixels.

Example 25

One or more computer-readable media storing processor-executable instructions that when executed cause processors to implement a method that facilitates acceleration of dense optical flow (DOF) determinations with a single-instruction multiple-data (SIMD) computing system, the method comprising: obtaining an image by a SIMD computing system, wherein the image is formatted as a canonical discretized rectangular grid of pixels; producing, by the SIMD computing system, DOF data of a portion of the image by: defining a SIMD window of pixels of the portion of the image, wherein the window includes multiple pixels of the portion of the image; and performing a successive over-relaxation (SOR) operation simultaneously on each the pixels of the SIMD window, wherein the SOR operation performed on each pixel of the window is performed without local dependencies within the window; presenting DOF data resulting from the production.

Example 26

A method of Example 25, wherein the SOR operation performed on each pixel of each window is performed with dependencies outside its own window.

Example 27

A method of Example 25, wherein the SOR operation performed on each pixel of each window is performed with dependencies to diagonally adjacent neighbors that are outside its own window.

Example 28

A method that facilitates acceleration of dense optical flow (DOF) determinations with a single-instruction multiple-data (SIMD) computing system, the method comprising: obtaining an image by a SIMD computing system, wherein the image is formatted as a canonical discretized rectangular grid of pixels; producing, by the SIMD computing system, DOF data of the image by: defining multiple SIMD windows of pixels of the image, wherein each window includes multiple pixels of the image and only a portion of the image; and performing a successive over-relaxation (SOR) operation simultaneously on each the pixels of each of the SIMD windows, wherein the SOR operation performed on each pixel of each window is performed without local dependencies within its own window; presenting the produced DOF data of the image; and taking action based upon the presented DOF data.

Example 29

A method of Example 28, wherein the multiple SIMD windows collectively includes the pixels of the image.

Example 30

A method of Example 28, wherein the SIMD window is a row window that is one row high and multiple columns wide.

Example 31

A method of Example 28, wherein the SOR operation performed on each pixel of each window is performed with dependencies outside its own window.

Example 32

A method of Example 28, wherein the SOR operation performed on each pixel of each window is performed with dependencies to diagonally adjacent neighbors that are outside its own window.

Example 33

A method of Examples 28 to 32, wherein the taking action includes estimating motion of objects in the image.

Example 34

A method of Examples 28 to 32, wherein the producing of the DOF data includes transforming results of the simultaneous SOR operations to correspond with a canonical discretized rectangular grid of pixels.

Example 35

A method comprising: receiving real-time video feed by the SIMD computing system; repeating the method of Examples 28 to 34, wherein the obtained image of each repetition is a successive frame from the real-time video feed.

Example 36

A method of Example 35, wherein the production of the DOF data of one frame occurs before the production of the DOF data for its next successive frame.

Example 37

One or more computer-readable media storing processor-executable instructions that when executed cause processors to implement a method comprising: obtaining an image by a parallel-processing computing system; obtaining a thread count (T) and a total number of iterations (n) for convergence of an iterative dense optical flow (DOF) operation performed on the obtained image; determining number of iterations per thread (IPT) based upon the thread count and total number of iterations; simultaneously executing multiple threads of a processor of the parallel-processing computing system, wherein each thread performs the iterative converging DOF operation on pixels of the obtained image; repeating the simultaneous execution of the multiple threads a number of times matching the determined IPT number; producing, by the parallel-processing computing system, DOF data of the image based upon results from the simultaneously executed threads; by: presenting the produced DOF data of the image; and taking action based upon the presented DOF data.

Example 38

One or more computer-readable media of Example 37, wherein the simultaneous execution of the threads includes delayed dispatch of some of the threads.

Example 39

One or more computer-readable media of Examples 37 and 38, wherein the IPT number is based upon the total number of iterations divided by the thread count.

Example 40

One or more computer-readable media of Example 37, wherein the image is formatted as a canonical discretized rectangular grid of pixels and the processor of the parallel-processing computing system is a single-instruction multiple-data (SIMD) processor.

Example 41

One or more computer-readable media of Example 40, wherein the producing comprises: defining multiple SIMD windows of pixels of the image, wherein each window includes multiple pixels of the image and only a portion of the image; and performing a successive over-relaxation (SOR) operation simultaneously on each the pixels of each of the SIMD windows, wherein the SOR operation performed on each pixel of each window is performed without local dependencies within its own window.

Example 42

One or more computer-readable media of Example 41, wherein the SOR operation performed on each pixel of each window is performed with dependencies outside its own window.

Example 43

One or more computer-readable media of Example 41, wherein the SOR operation performed on each pixel of each window is performed with dependencies to diagonally adjacent neighbors that are outside its own window.

Example 44

One or more computer-readable media of Examples 37-43, wherein the taking action includes estimating motion of objects in the image.

Example 45

One or more computer-readable media of Examples 41-43, wherein the producing of the DOF data includes transforming results of the simultaneous SOR operations.

What is claimed is:
1. A parallel-processing computing system that facilitates acceleration of dense optical flow (DOF) determinations, the system comprising:
   an image handler configured to obtain an image that is stored in a memory;
   an initializer configured to obtain a thread count (T) and a total number of iterations (n) for convergence of an iterative dense optical flow (DOF) operation performed on the obtained image, the initializer being further configured to determine a number of iterations per thread (IPT) based upon the thread count and the total number of iterations; and a parallel processor configured to simultaneously execute multiple threads, each thread performing the iterative converging DOF operation on pixels of the obtained image, the parallel processor being further configured to repeat the simultaneous execution of the multiple threads a number of times matching the determined IPT number to produce DOF data of the image, wherein the simultaneous execution of the multiple threads is performed in accordance with an execution of a successive over-relaxation (SOR) operation performed simultaneously on each of the pixels included within a plurality of windows that are defined within the image, and wherein the SOR operation is performed on each of the pixels within each window from among the plurality of windows without local dependencies within its own respective window.

2. A system as recited in claim 1, wherein the simultaneous execution of the multiple threads includes dispatching some of the threads with a delay between one dispatch to the next.

3. A system as recited in claim 1, wherein the IPT number is based upon the total number of iterations divided by the thread count.

4. A system as recited in claim 1, wherein the image is formatted as a canonical discretized rectangular grid of pixels and the processor of the parallel-processing computing system is a single-instruction multiple-data (SIMD) processor.

5. A system as recited in claim 4, wherein each window from among the plurality of windows defined within the image is an SIMD window.

6. A system as recited in claim 5, wherein the SOR operation performed on each pixel of each window from among the plurality of windows is performed with dependencies outside its own respective window.

7. A system as recited in claim 5, wherein the SOR operation performed on each pixel of each window from among the plurality of windows is performed with dependencies to diagonally adjacent neighbors that are outside its own respective window.

8. A system as recited in claim 5, wherein the production of the DOF data includes transforming results of the simultaneous SOR operations to correspond with a canonical discretized rectangular grid of pixels.

9. A system as recited in claim 1, wherein performing the SOR operation without local dependencies includes removing single-instruction multiple-data (SIMD) dependencies.

10. One or more non-transitory computer-readable media storing processor-executable instructions that, when executed, cause processors to implement a method comprising:

obtaining an image by a parallel-processing computing system;

obtaining a thread count (T) and a total number of iterations (n) for convergence of an iterative dense optical flow (DOF) operation performed on the obtained image;

determining a number of iterations per thread (IPT) based upon the thread count and the total number of iterations; and simultaneously executing multiple threads of a processor of the parallel-processing computing system, wherein each thread performs the iterative converging DOF operation on pixels of the obtained image, to repeat the simultaneous execution of the multiple threads a number of times matching the determined IPT number to produce DOF data of the image, and to take action based upon the produced DOF data, wherein the simultaneous execution of the multiple threads is performed in accordance with an execution of a successive over-relaxation (SOR) operation performed simultaneously on each of the pixels included within a plurality of windows that are defined within the image, and wherein the SOR operation is performed on each of the pixels within each window from among the plurality of windows without local dependencies within its own respective window.

11. One or more non-transitory computer-readable media as recited in claim 10, wherein the simultaneous execution of the threads includes dispatching some of the threads with a delay between one dispatch to the next.

12. One or more non-transitory computer-readable media as recited in claim 10, wherein the IPT number is based upon the total number of iterations divided by the thread count.

13. One or more non-transitory computer-readable media as recited in claim 10, wherein the image is formatted as a canonical discretized rectangular grid of pixels and the processor of the parallel-processing computing system is a single-instruction multiple-data (SIMD) processor.

14. One or more non-transitory computer-readable media as recited in claim 13, wherein each window from among the plurality of windows defined within the image is an SIMD window.

15. One or more non-transitory computer-readable media as recited in claim 14, wherein the SOR operation performed on each of the pixels within each window from among the plurality of windows is performed with dependencies outside its own respective window.

16. One or more non-transitory computer-readable media as recited in claim 14, wherein the SOR operation performed on each of the pixels within each window from among the plurality of windows is performed with dependencies to diagonally adjacent neighbors that are outside its own respective window.

17. One or more non-transitory computer-readable media as recited in claim 14, wherein the production of the DOF data includes transforming results of the simultaneous SOR operations to correspond with a canonical discretized rectangular grid of pixels.

18. One or more non-transitory computer-readable media as recited in claim 10, wherein performing the SOR operation without local dependencies includes removing single-instruction multiple-data (SIMD) dependencies.

* * * * *